з,368,021
FURNACE FOR REFRACTORY METALS
Pai Yen Loung, 3119 David Ave.,
Palo Alto, Calif. 94303
Original application Nov. 15, 1962, Ser. No. 237,987, now Patent No. 3,160,497, dated Dec. 8, 1964. Divided and this application Oct. 15, 1964, Ser. No. 416,665
5 Claims. (Cl. 13—23)

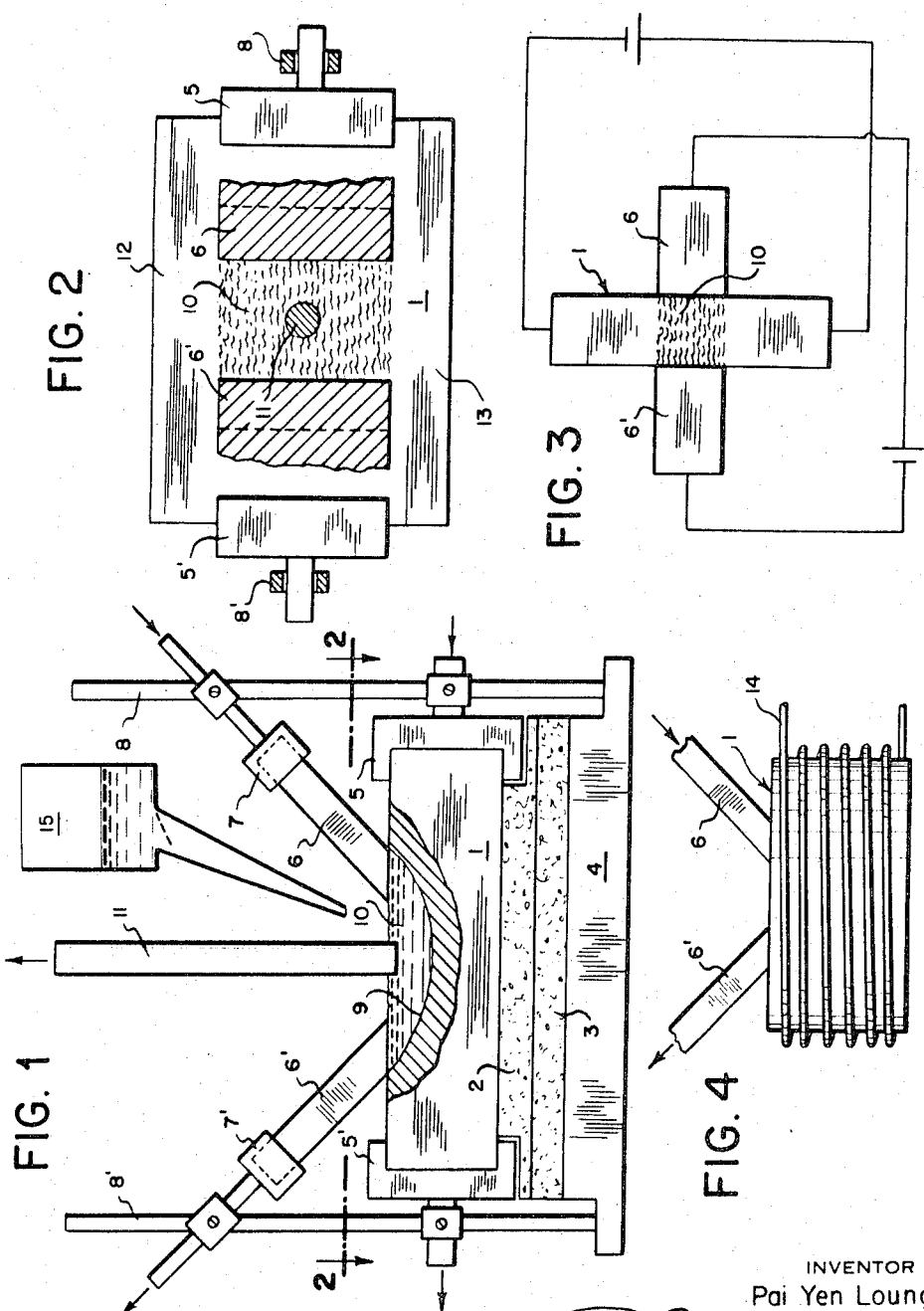

ABSTRACT OF THE DISCLOSURE

An apparatus for melting refractory metals including a sintered block of the refractory metal, means for passing through the block a first electric current sufficient to heat the block and to close the voids in a predetermined portion of the block thereby increasing the electrical and thermal conductivity of the predetermined portion and means for passing a second electric current through the predetermined portion of the block to act together with the first electric current in melting part of the refractory material, the unmelted sintered portion of the block insulating and containing the melted portion.

---

This invention relates to an apparatus for melting metals and forming ingots therefrom and more particularly relates to an apparatus for melting and forming ingots from refractory metals, especially tungsten.

The present application is a division of my copending application Ser. No. 237,987, filed Nov. 15, 1962, now Patent No. 3,160,497.

Refractory metals, such as tungsten, molybdenum, tantalum, and niobium have extremely high melting points. For example, tungsten has the highest melting point of any pure metal, about 3,370° C.; tantalum has a melting point of about 2,850° C. Because of their high melting points, exceptional difficulties are encountered in melting these refractory metals and in molding or manufacturing articles from them.

Two major problems are involved in melting a refractory metal. The first is the generation of sufficient heat to melt the metal; the second is a means for containing the metal in its molten form.

In general, melting of metals such as tungsten is achieved by the arc melting or by the electron beam methods. The arc melting method is limited in that it can melt the tungsten only on a drop-by-drop basis. Therefore, uniform melting is almost impossible to achieve. Further, the melting period in the arc melting method is very short, thus offering little opportunity for gases and other impurities to escape from the molten metal. The electron beam method is also limited in that thorough melting is not possible. In addition, the electron beam must be operated in a high vacuum, and for metals having very high melting points and high vapor pressures this may interfere with the melting operation. The electron beam method is, moreover, an expensive method of melting.

Suitable means for containing the high melting point metals in their molten state are limited. The apparatus is either complex, presents contamination problems, or both. For example, water-cooled copper containers as are commonly used in handling molten tungsten are likely to cause contamination of the metal, particularly at the surface of the tungsten ingot. An additional problem in using such containers is that the temperature of the container must be carefully controlled to avoid extreme temperature differentials which might lead to explosion of the container. Where carbon containers are used, the tungsten will combine with the carbon to form tungsten carbide. It is apparent that the problems of containing the molten refractory metal also apply to molds used in the molding of the metal.

Due in part to the difficulties involved in melting, containing, and molding of the high melting point refractory metals, the art of powder metallurgy has developed. In the practice of powder metallurgy particles of the metal are pressed together under high pressure, and usually presintered, sintered, swaged, reheated, and swaged again. The steps involved in producing a rod or other articles are numerous, time consuming and costly. At no point in the process is the metal in molten form because the highest sintering temperature is about 90–95% of the melting point of the metal. Therefore, no matter how high the compression of the powder, the metal cannot be pressed into its crystalline form. Thus, manufacturing articles by powder metallurgy produces at best a relatively porous, weak, brittle product which does not exhibit the true mechanical and physical properties of the metal.

By following the teachings of the present invention it is possible to thoroughly and uniformly melt such refractory metals as tungsten, and to maintain the metal in molten form for extended periods of time. It is further possible to produce rods or ingots directly from the molten metal, and if desired, to produce the rods on a continuous basis.

The present invention is based upon the discovery that a predetermined or localized portion of a sintered block of refractory metal, such as tungsten, may be melted to create a pool of molten metal in a crucible portion of the block, the crucible portion being formed as a result of the melting process itself. It is further based upon the discovery that the crucible portion may be created by the concentration of heat generated by separate and crossing or converging electric currents in a specific, predetermined localized area of the block without melting other portions of the block, and that the unmelted remainder of the block acts as an effective insulator for the crucible portion. In addition, it has been discovered that ductile rods of refractory metal can be produced directly from the molten metal pool by means of a "seeding" rod which is placed in contact with the molten metal and then gradually withdrawn.

To illustrate the process and the apparatus of the invention a preferred embodiment is described below with reference to the accompanying drawings.

FIG. 1 is an elevation of the principal parts of the furnace and shows a partial section of the block to illustrate the crucible portion.

FIG. 2 is a plan view of the apparatus shown in FIG. 1.

FIG. 3 is a schematic illustrating an alternate arrangement of the block and the electrodes.

FIG. 4 is an elevation of another embodiment of the invention illustrating electrical induction means for heating the block.

Referring to FIGS. 1 and 2 a sintered block of the refractory metal to be melted is designated generally as 1. The block 1 is supported by two insulating layers 2 and 3, which in turn are supported by a foundation 4. Attached to opposite ends of the block 1 are electrical connecting means 5 and 5'. The electrical connecting means are preferably made of copper and have water-cooling jackets, not shown.

Disposed above the block 1 and in contact therewith are two spaced apart sintered electrodes 6 and 6'. These electrodes 6 and 6' are made of the same refractory material as is block 1. Each electrode has electrical connecting means 7 and 7' at the end opposite the end contacting the block 1. As in the case of the electrical connecting means used with block 1, the connectors 7 and 7' are preferably made of copper and surrounded by a water-cooling jacket, not shown. Suitable support rods 8 and 8' hold the electrical connectors in place.

The partial section shown in FIG. 1 illustrates the crucible portion 9 containing a pool of molten metal 10. The crucible 9 and the pool 10 are both formed as a result of the localized melting of the upper portion of the block 1, which process is to be described in detail later. Contacting the pool 10 is a sintered rod 11 made of the same refractory metal as that making up the block 1 and the electrodes 6 and 6'. Rod 11 acts as a seeding rod and is used as a means for making an ingot or rod of metal directly from the molten pool.

The drawings illustrate the principal features of the invention. During operation the entire furnace should preferably be under cover and in the environment of an inert gas, hydrogen gas, or in some cases under a partial vacuum. Also not shown is means by which the seeding rod 11 may be withdrawn, there being a variety of means possible. Means for adding pellets or particles of unmelted metal to the molten pool 15 may be provided when it is desired to operate the system on a continuous basis.

To form rods or ingots of refractory metal the furnace is operated by first passing an electrical current through the block 1 via electrical connectors 5 and 5'. Because of the resistance of the metal comprising the block, the block becomes heated. It is noted that while all the refractory metals exhibit a generally high degree of resistivity, the fact that the block is sintered increases its resistance. This higher resistance of the sintered metal is due to its relatively porous nature, the particles not being in as intimate relationship as in a crystalline molded product. By controlling the current, a sufficient amount can be passed through the block to cause it to heat to a temperature near the melting point of the metal comprising the block. As the resistance heating of the block 1 progresses and the temperature approaches the melting point the electrical conductivity increases due to the closing of the voids in the sintered material. This phenomenon is put to useful advantage in arranging the electrical connectors 5 and 5' to direct current through a narrowed part of the block 1, as best shown in FIG. 2. By so directing the current, the side portions of the block 12 and 13 remain at a relatively lower temperature and therefore have lower electrical and thermal conductivity. Thus, the relatively porous sintered block 1 acts as an insulator to contain and concentrate the heat generated by the electrical current. Similarly, concentration of the current in the upper portion of the block may be effected by other designs or arrangements of the electrical connectors 5 and 5'.

Simultaneously with the heating of the block 1, or subsequent thereto, a second electric current is passed through the upper central portion of the block 1 by passing current from one electrode 6 through the block, and to the second electrode 6'. Since the current will take the shortest distance available between the two electrodes 6 and 6' it will necessarily pass through the upper central portion. The fact that that portion is previously heated will make it more conductive and more receptive to current and further assist in localizing the current. The current passing through the electrodes 6 and 6' causes that portion of the block 1 located between the electrodes and somewhat below the surface of the block to be subjected to the energy from both electrical currents. Thus, that portion of the block 1 which is subjected to this cross-current heating becomes heated to a much greater degree than the rest of the block. By passing sufficient additional current through the block 1 between the electrodes 6 and 6' it is possible to raise the temperature of the block at that portion to a temperature above the melting point. When the melting point is reached that predetermined portion of the block 1 melts and a molten pool of metal 10 is formed. At the same time, the melting of the metal causes a carving-out of the block at the area of cross-current heating thereby forming a crucible portion 9 in the block 1.

The crucible portion 9 is unique. It is not permanent as is an ordinary crucible but is dependent upon several factors, particularly the input and output energy required for heating and the rates of charging and removing metal from the molten pool 10. By controlling these factors the size of the crucible can be maintained within the limits which are preferable for the efficient operation of the furnace.

After the molten pool of metal 10 has been created in the crucible portion 9 of the block 1, the rod or ingot is formed directly from the molten pool, as best illustrated in FIGURE 1. There a sintered rod 11 made of the same refractory metal as comprises the block 1 and electrodes 6 and 6' is dipped into the pool 10. Upon contact with the pool 10, the molten metal immediately surrounding the end of the rod 11 will cool due to the lower temperature of the rod and thus crystallize upon the end of the rod. As the rod 11 is slowly withdrawn from the molten pool 10, metal will continue to crystallize upon the built-up and successively cooled portion at the rod's end. In this manner an extension of the rod 11 is continuously formed. The extension so formed is metal in its pure crystalline state and exhibits all the characteristics of the true metal. It is less porous, less brittle, and more ductile than a similar rod formed by sintering.

By practicing this method of ingot formation it can be seen that the method is particularly adaptable to continuous operation. Continuous operation can be performed by simply charging the molten pool with pellets or other particles of the metal at a rate commensurate with the withdrawal of metal from the pool. In contrast, if batch production is desired the electrodes 6 and 6' may be used to charge the pool, by gradually dipping them into the pool, thus consuming the electrodes.

A number of advantages are gained by following the teachings of this invention.

The melting of a portion of the sintered block, thereby creating a molten pool of metal in a crucible portion, avoids the use of separate containers to hold the molten metal. The very block of refractory metal which was melted acts as a container for the melted metal. This being the case there is absolutely no chance of contamination or impurities reaching the metal from any other source.

In addition, no extra cooling means are needed to keep the container from melting. Because of the porous nature of the sintered block with its multitudinous voids, the block also acts as an insulator to prevent the rapid dispersion of heat from the molten pool. Since it is possible to maintain a pool of the metal for extended periods of time, impurities in the metal such as iron, nickel, cobalt, manganese and chromium are given an opportunity to volatilize and escape, thereby further purifying the metal to an extremely high degree. Maintenance of a molten pool also provides thorough and uniform melting.

The concept of using a seeding rod upon which to build an ingot has the advantage of avoiding intervening steps such as pouring and molding to form an ingot. The advance over the numerous steps involved in powder metallurgy is apparent.

The principal advantage, however, is that rods or ingots so formed exhibit the characteristics of the true metal because natural crystallization is permitted. Thus, they are in better condition for further processing such as wire-drawing. Further, by controlling the size of the seeding rod, and the rates of cooling and withdrawal, relatively long single crystals will form, thus enhancing the ductility of the metal. Crystallization further purifies the metal.

To illustrate the size and power requirements involved in the practice of the invention the following example is given. A block of sintered tungsten having length of 12" a width of 5" and a depth of 1" is used as the main component of the furnace. Electrical connectors, suitably water-cooled, having a width of 3" are affixed to either end of the block. Two electrodes of sintered tungsten, each having a length of 3″, a width of 3″ and a thickness of ¾″ are disposed above the block and each has one end in contact with the top surface of the block. The electrodes are spaced apart and opposite to each other. Affixed at the other end are water-cooled electrical connectors. In operation the furnace is placed under the cover of an inert gas and the water cooling circulation started. Electrical current of approximately 10,000 amps is passed through the main block, heating the middle portion to about 3,000° C. A second electrical current of about 5,000 amps is passed through the electrodes and through the upper central heated portion of the block, heating that portion to over 4,000° C. and melting it. One end of a sintered tungsten seeding rod is then introduced contacting the melted part, which is a pool in a crucible portion of the block. The seeding rod is then slowly withdrawn, and due to the cooling as the rod is withdrawn, the tungsten crystallizes on the end forming an extension.

A number of embodiments of the invention may be made without departing from the spirit of the invention.

For example, as shown in FIGURE 4 alternate means of heating the main block 1 are available. In that figure electrical induction means 14 are used in combination with resistance heating by the electrodes 6 and 6′. It would also be possible to have various combinations of resistance heating, induction heating, solar heating, arc heating, electron beam heating and plasma heating without departing from the concept of heating a main block and concentrating heat generated from a second source at a portion of the block to cause localized melting of the block.

The arrangement of the electrodes is not limited to the embodiments shown. For example, several pairs of electrodes may be used and the paths taken by the electrical currents may be directed differently. The result to be achieved is the crossing of the currents at a given predetermined portion of the block to cause concentration of the heat.

In the present embodiment, upward withdrawal of the metal by means of a seeding rod is contemplated. However, the metal could be removed from below or by other conventional means. Where a seeding rod is used, there is an additional advantage in that the rod could be run directly through rollers or a die thus saving steps in the continuous process.

I claim:
1. A furnace for melting tungsten comprising:
    (a) a sintered block of tungsten,
    (b) electrical connecting means attached to said block whereby a first electric current may be passed through said block thereby causing it to become heated,
    (c) two oppositely spaced apart tungsten electrodes, each said electrode further
        (i) having its one end in contact with said block at a predetermined portion thereof, and
        (ii) having electrical connecting means attached to its other end whereby a second electric current may be passed through said block at said portion thereof.
2. A furnace for melting tungsten in accordance with claim 1 having in addition means for continuously adding particles of tungsten to said molten pool.
3. A furnace for melting refractory metals comprising:
    (a) a block of the refractory metal including:
        (i) a sintered portion,
        (ii) an unsintered portion one surface thereof defining a crucible and having a greater electrical and thermal conductivity than the sintered portion, and
        (iii) a melted portion lining the surface of the unsintered portion defining the crucible,
    (b) means for passing a first electric current through the block at the unsintered portion and the melted portion of the block to supply heat to the unsintered portion and the melted portion; and
    (c) two oppositely spaced apart electrodes each electrode further
        (i) being composed of the refractory metal
        (ii) having one end in contact with the block at the melted portion thereof, and
        (iii) having electrical connecting means attached to its other end for passing a second electric current through the block at the melted portion to supply heat to the melted portion.
4. A furnace for melting refractory metals according to claim 3 wherein the means for passing a first electrical current through the block is an electrical connecting means attached to the block.
5. A furnace for melting refractory metals according to claim 3 wherein the means for passing a first electrical current through the block is an electrical induction means surrounding the block.

References Cited
UNITED STATES PATENTS

| | | | |
|---|---|---|---|
| 967,909 | 8/1910 | Harden | 13—3 |
| 984,970 | 2/1911 | Rodenhauser | 13—3 |
| 1,901,525 | 3/1933 | Moschel | 13—23 |
| 1,939,623 | 12/1933 | Clamer | 13—5 |
| 2,962,363 | 11/1960 | Martin | 148—1.6 X |
| 2,977,258 | 3/1961 | Dunkle | 148—1.6 |

RICHARD M. WOOD, *Primary Examiner.*

VOLODYMYR Y. MAYEWSKY, *Examiner.*